United States Patent [19]

Govaert

[11] 4,403,149

[45] Sep. 6, 1983

[54] PULSE PROCESSOR

[75] Inventor: Johan A. Govaert, Peabody, Mass.

[73] Assignee: Baird Corporation, Bedford, Mass.

[21] Appl. No.: 223,735

[22] Filed: Jan. 9, 1981

[51] Int. Cl.³ .............................................. G01T 1/20
[52] U.S. Cl. .................................... 250/369; 307/359
[58] Field of Search ................ 250/369; 307/261, 268, 307/359

[56] References Cited

U.S. PATENT DOCUMENTS 2,750,513  6/1956  Robinson et al. .................... 250/369
3,046,543  7/1962  Kaenel ............................... 307/359

Primary Examiner—Bruce C. Anderson
Attorney, Agent, or Firm—Morse, Altman & Dacey

[57] ABSTRACT

A pulse processor for use in a scintillation counter for converting detected scintillations to coded digital signals. The pulse processor includes means for receiving detected scintillations, a delay member coupled to the means, and bistable means coupled to both the means and the delay member for generating coded digital signals responsive to the detected scintillations. The width of the digital signals is proportional to the height of the detected scintillations.

11 Claims, 2 Drawing Figures

PULSE PROCESSOR

BACKGROUND OF THE INVENTION

1. Field of the Invention

The present invention relates generally to pulse processors and, more particularly, to a pulse processor for use in scintillation counters.

2. The Prior Art

Scintillation counters find important and widespread applications in oil well data logging and in scintillation cameras used in the relatively recent but fast-growing field of nuclear medicine. In oil well data logging, the resultant analog signals normally have to be transported over long distances in noisy environments. Consequently, the signals are subjected to considerable distortions and, on occasions the signals are lost altogether. In scintillation cameras, on the other hand, when counting at high levels, the zero reference D.C. voltage level is also raised to a high level. As a result, it becomes progressively more difficult to measure the heights of the analog signals, affecting thus the accuracy of the readings. Further, scintillation cameras usually have a plurality of channels of pulse collectors. For reasons of accuracy, noise susceptibility, count rate or simplicity, it is often advisable to process the signals of only some of the channels and to disregard the signals from the other channels. Achieving such selective processing of the signals by multiplexing or by switching the analog signals is at best a slow and cumbersome process. There has existed, therefore, a need to process signals in scintillation counting in a manner that avoids the above disadvantages.

SUMMARY OF THE INVENTION

It is a principal object of the present invention to overcome the above shortcomings by providing a pulse processor for use in scintillation counters for converting detected scintillations to coded digital signals.

More specifically, it is an object of the present invention to provide a pulse processor that comprises means for receiving detected scintillations, a delay member operatively coupled to the means, and bistable means coupled to both the means and the delay member for generating coded digital signals responsive to the detected scintillations. The width of the generated digital signals is proportional to the height of the detected scintillations. Preferably, the means for receiving detected scintillations includes a comparator and a capacitor coupled to one of the inputs to the comparator. The detected scintillations are coupled, preferably via a preamplifier, to the other one of the inputs to the comparator. The pulse processor acts to reduce the widths of the detected scintillations and also restores the zero reference D.C. voltage level. The pulse processor greatly enhances, therefore, the accuracy and reliability of scintillation counters, be they employed in oil well data logging or in scintillation cameras used in nuclear medicine.

Other objects of the present invention will in part be obvious and will in part appear hereinafter.

The invention accordingly comprises the pulse processor of the present disclosure, its components, parts and their interrelationships, the scope of which will be indicated in the appended claims.

BRIEF DESCRIPTION OF THE DRAWINGS

For a fuller understanding of the nature and objects of the present invention, reference is to be made to the following detailed description, which is to be taken in connection with the accompanying drawings, wherein.

DETAILED DESCRIPTION OF THE PREFERRED EMBODIMENT

In general, the present invention provides a pulse processor for use in a scintillation counter for amplifying and converting detected scintillations to coded digital signals. The width of the resultant digital signals is proportional to and thus representative of the height of the detected scintillations. The pulse processor enhances the accuracy and reliability of scintillation counters, whether employed in oil well data logging or in scintillation cameras for nuclear medicine. The pulse processor facilitates the transmission of signals, without distortion and/or loss, over long distances and in noisy environments. The pulse processor also reduces the width of the detected oscillations and restores the zero reference D.C. voltage level even during high counting rate operations. The pulse processor permits the utilization of much simplified digital electronics in the processing of signals derived from detected scintillations. The pulse processor also allows for the selective processing of signals with ease.

The term "scintillation" as used in this specification and the claims is intended to define a flash of light emitted by a substance (a fluor, such as, for example, a thallium-activated sodium iodine crystal) when contacted by ionizing radiation (such as, for example, a high energy photon) emitted by a nucleus in a transition between two energy levels. The term "scintillation counter" (also known as scintillation detector) as used in this specification and the claims is intended to define a device in which scintillations produced in a fluorescent substance by ionizing radiation are detected and counted by photomultiplier tubes and associated circuitry. The term "detected scintillation" as used in this specification and the claims is intended to define a data signal generated by a detector, such as a photomultiplier tube, when that detector detects a flash of light (i.e., a scintillation) emitted by a fluorescent substance sensing a radioactive event. The term "scintillation camera" as used in this specification and the claims is intended to define a camera, used in nuclear medicine and nuclear research, that gives a complete image of radionuclide distribution in a particular area of the human body in one exposure, in contrast to line-scanning techniques.

Figure 1:
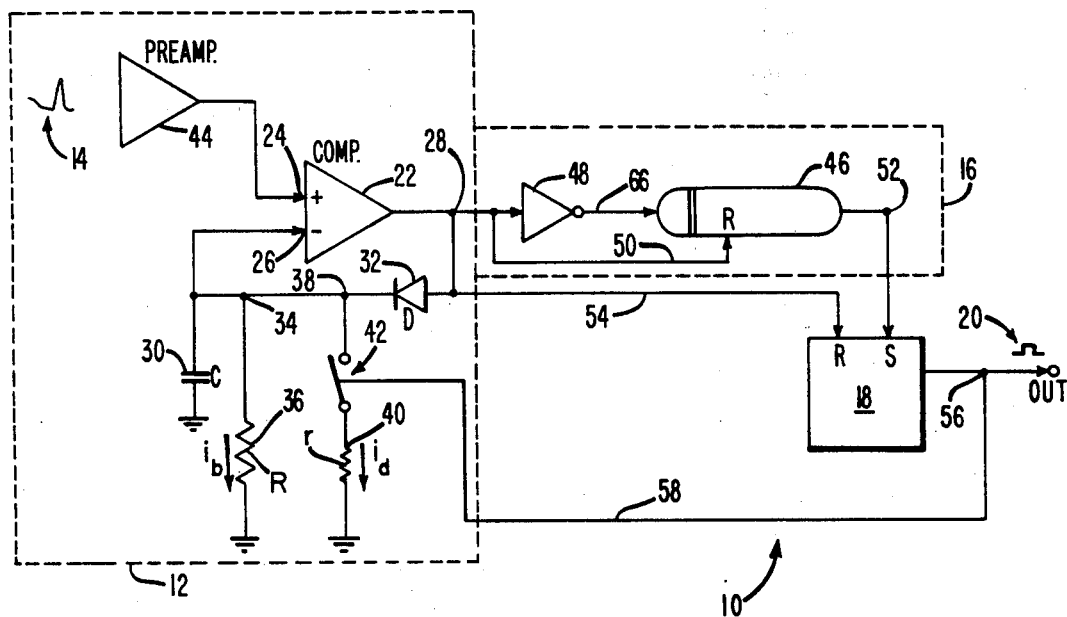
FIG. 1 is a schematic diagram of a preferred embodiment of a pulse processor constructed according to the invention.

A preferred embodiment of a pulse processor 10 constructed according to the invention is schematically illustrated in FIG. 1. Pulse processor 10 essentially comprises means 12 for receiving a detected scintillation 14, a delay member 16 coupled to the means 12, and bistable means 18 coupled to both the means 12 and the delay member 16 for generating a coded digital signal 20 in response to the detected scintillation 14. The width of the digital signal 20 is proportional to, and thus representative of, the height of the detected scintillation 14.

The means 12 for receiving the detected scintillation 14 includes a comparator 22, which preferably is a linear comparator. Comparator 22 has a positive input 24 and a negative input 26 and an output 28. A capacitor 30 (C) and a diode 32 are connected in a feedback loop of the comparator 22 between its output 28 and its negative input 26. The connection, as at 34, between the capacitor 30 and the diode 32 is connected to ground via a high resistance 36 (R) (preferably about 22 Kohms), effectively establishing a relatively low discharge current $i_b$ to the capacitor C. The connection, as at 38, between the capacitor 30 and the diode 32 also is parallel connected to ground via a low resistance 40 (r) (preferably about 3.9 Kohms) and a normally open switch 42, effectively establishing a relatively high discharge current $i_d$ to the capacitor C when switch 42 is closed. Preferably, the detected scintillation 14 is first inputted to a detector preamplifier 44 which amplifies it and converts it into a voltage ($e_i$) at its output that is coupled to the positive input 24 of the comparator 22. It will be appreciated that, in the absence of detected scintillations 14 being inputted to the positive input 24 of the comparator 22 via the detector preamplifier 44, the voltage ($e_c$) on the capacitor 30 will closely follow the detector preamplifier output voltage ($e_i$). This output voltage ($e_i$) generally is at some positive offset level, note FIG. 2. This is so since a charge current flows continuously, when there is no detected scintillation 14, from the comparator output 28 through the diode 32 to the capacitor 30. At the same time, a small bias current ($i_b$) flows continuously through the high resistance (R) 40, continuously discharging the capacitor 30. It will also be appreciated that the detected scintillations 14 are data signals generated by suitable detectors, such as photomultiplier tubes, of a scintillation counter, such as a camera used in nuclear medicine. One such scintillation camera is disclosed in my pending application Ser. No. 061,984 filed July 7, 1979, entitled Radioactivity Distribution Detection System and Crystal Detector Assembly, now U.S. Pat. No. 4,267,452, granted May 12, 1981, the teachings of which are incorporated herein by reference. As more fully disclosed in this pending application Ser. No. 061,984, scintillation crystals 16, activated by sensing a radioactive event, emit flashes of light. These flashes of light are in turn detected by photomultiplier tubes 18 that generate data signals in response to these detected flashes of light. These detected flashes of light are referred to herein as detected scintillations 14. One preferred way of utilizing the pulse processor 10 of the present invention is to incorporate it in the radioactivity distribution detection system of pending application Ser. No. 061,984, between a photomultiplier tube 18 and the front-end electronics 34 thereof. For each photomultiplier tube 18, there will be a separate pulse processor 10. Of course, the front-end electronics 34 will have to be considerably redesigned into a much simplified structure for processing the coded digital signals 20 produced by the pulse processors 10 in lieu of the detected scintillations 14. As mentioned, the pulse processor 10 reduces the width of the detected scintillations 14 and restores the zero reference D.C. voltage level even at high counting levels. These two features are most advantageous, hence desirable, in contributing to the speed and accuracy in the counting of high-energy particles, be they alpha, beta or gamma rays.

The delay member 16, which is coupled to the means 12 for receiving the detected scintillations 14, includes a resettable delay line 46 and an inverter 48. The delay line 46 is resettable via lead 50 also connected to the comparator output 28. As mentioned, in the absence of detected scintillations 14, a charge current flows continuously from the comparator output 28 which, in addition to charging the capacitor 30 through the diode 30, also continuously resets the delay line 46 via the lead 50. Consequently, either only a low level output signal or no output signal is generated by the delay line 46 at its output 52. It will be observed that the same charge current flowing continuously, in the absence of detected scintillations 14, from the comparator output 28, also continuously resets the bistable multivibrator 18 via lead 54. As a result, no coded digital signal 20 appears at the output 56 of the multivibrator 18 while it is in the reset (R) state. Since the multivibrator output 56 is also the output of the pulse processor 10, no digital signals 20 are generated thereby and none appear at the pulse processor output, as of course it should be, until a detected scintillation 14 occurs. As may also be observed, the output 56 is also connected via lead 58 to the switch 42, normally open.

Operation of the Pulse Processor

Figure 2:
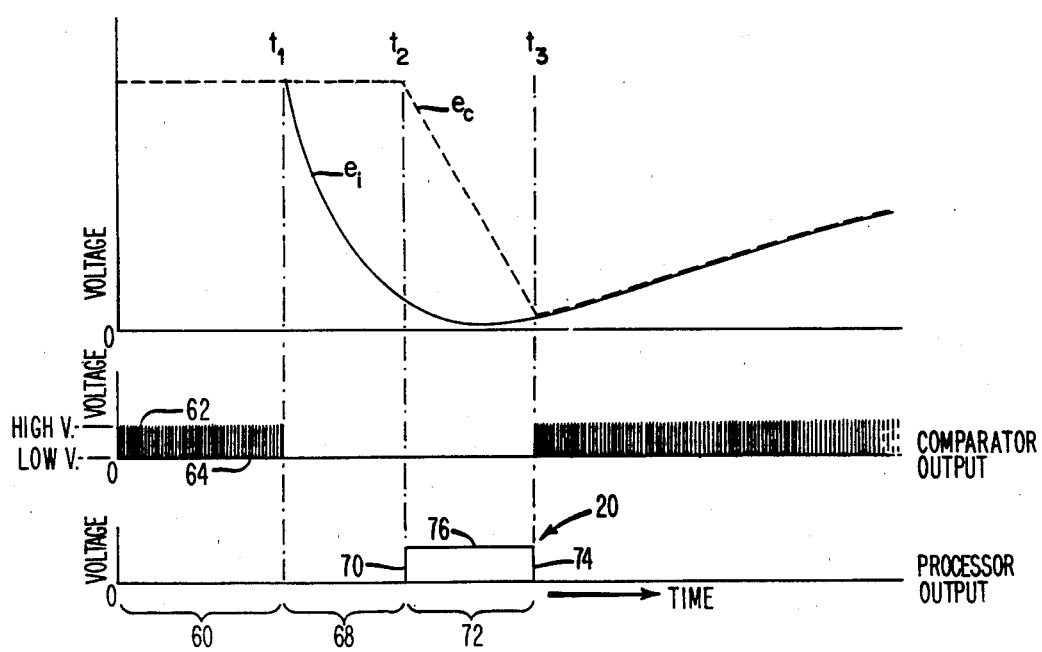
FIG. 2 is a graphical representation of input and output signals of the pulse processor of FIG. 1 and illustrates certain principles of its operation.

The principles of operation of the pulse processor 10 of the invention are best explained with reference to FIG. 2. During a time period 60 when no detected scintillations 14 are present, the voltage ($e_c$) on the capacitor 30 closely follows the output voltage ($e_i$) of the preamplifier 44. This is so since during this time period 60, the output of the comparator 22 flips, in an oscillatory manner, between a high 62 and a low or zero voltage 64. This causes the pulsating charge current to flow through the diode 32, through the lead 50 and through the lead 54. The current through the diode 32 is responsible to make the capacitor voltage ($e_c$) follow the preamplifier voltage ($e_i$). The current through the lead 50 is responsible to keep the delay line 46 in the reset (R) condition. And the current through the lead 54 is responsible to keep the multivibrator 18 in its reset (R) condition.

The arrival, at time $t_1$, of a detected scintillation 14 at the input of the preamplifier 44, causes a rapid change in the preamplifier output voltage ($e_1$). This rapid change in the preamplifier output voltage ($e_1$) is responsible for:
1. clamping the comparator output voltage to the low or zero level 64; 2. disabling the capacitor voltage ($e_c$) from following the preamplifier output voltage ($e_i$); 3. removing the charge current in leads 50 and 54; and 4. activating the inverter 48 and thereby, via lead 66, the delay line 46. It should be noted that during this time period 68, the output of the pulse processor 10 remains at the zero level. At the end of the time period 68, i.e., at time $t_2$, the delay line 46 will change its output at 52 from a no or a low level to a high level output. This high level output at 52 causes a change of condition of the bistable multivibrator 18 from the reset (R) to the set (S) state. As a result, the multivibrator output at 56, which is also the output of the pulse processor 10, changes as a step function 70 from a zero voltage to some voltage. This change multivibrator output immediately is coupled via lead 58 to close the normally open switch 42. As a result, a relatively large discharge current ($i_d$) begins to flow across the now closed switch 42 and the low resistance (r) to ground, rapidly discharging thereby the capacitor 30. The resulting steep voltage drop in the capacitor voltage ($e_c$) during this time period 72 is shown in FIG. 2, commencing at time $t_2$. At time $t_3$, both input voltages, i.e., the voltage ($e_i$) from the preamplifier 44 and the capacitor voltage ($e_c$), are once again equal to one another. This equilibrium condition at the inputs 24 and 26 of the comparator 22 starts its output again to flip between a low and high voltage and the charge current to flow from output 28 across the diode 32 to have the capacitor voltage ($e_c$) follow the preamplifier output voltage ($e_i$). This charge current flowing from output 28 also resets both the delay line 46 and the multivibrator 18 via leads 50 and 54, respectively. As a result, the output of the pulse processor 10 at the output 56 changes once again as a step function 74 to a zero voltage. The resultant digital signal 20 is pulse-width coded, with the width 76 of the signal 20 being proportional to the height of the detected scintillation 14.

Conclusion

Thus it has been shown and described a pulse processor 10 useful in scintillation counters for converting detected scintillations 14 to coded digital signals 20, which processor 10 satisfied the objects and advantages set forth above.

Since certain changes may be made in the present disclosure without departing from the scope of the present invention, it is intended that all matter described in the foregoing specification or shown in the accompanying drawings, be interpreted in an illustrative and not in a limiting sense.

What is claimed is:

1. A pulse processor comprising:
   (a) means for receiving detected scintillations; including a comparator, and a capacitor and a diode connected in a feedback loop of said comparator;
   (b) a member parallel coupled to the output of said comparator, said member including a resettable delay line and an inverter;
   (c) bistable means parallel coupled to the output of said comparator and coupled to the output of said member for generating coded digital signals responsive to said detected scintillations.

2. The pulse processor of claim 1 wherein the connection between said capacitor and said diode is connected to ground, and said capacitor is both continuously charged via said diode and discharged to ground.

3. The pulse processor of claim 2 wherein said connection between said capacitor and said diode to ground includes a closed coupling via a high resistance and a parallel coupling via a low resistance and a normally open switch.

4. The pulse processor of claim 1 further including a preamplifier also coupled to said comparator for converting said detected scintillations to a voltage.

5. The pulse processor of claim 3 wherein said bistable means is a multivibrator and said coded digital signals generated thereby are also parallel coupled to close said normally open switch, whereby said capacitor is rapidly discharged.

6. The pulse processor of claim 4 wherein the voltage on said capacitor closely follows the voltage of said preamplifier in the absence of said detected scintillations.

7. A pulse processor for use in a scintillation counter for converting a detected scintillation to a digital signal comprising:
   (a) means, including a comparator, for receiving said detected scintillation, said comparator having positive and negative inputs and an output, said means further including a capacitor and a diode connected in a feedback loop between said negative input and said output of said comparator, the connection between said capacitor and said diode being coupled to ground via a high resistance and parallel coupled to ground via a low resistance and a normally open switch;
   (b) a preamplifier coupled to said positive input of said comparator, the voltage on said capacitor closely paralleling the voltage of said preamplifier until the arrival of said detected scintillation;
   (c) a member parallel coupled to said comparator output, said member including a resettable delay line and an inverter; and
   (d) bistable means parallel coupled to said comparator output and to the output of said resettable delay line for generating said coded digital signal responsive to said detected scintillation, the width of said coded digital signal being proportional to the height of said detected scintillation.

8. The pulse processor of claim 7 wherein said coded digital signal is coupled to close said normally open switch, allowing said capacitor to be discharged rapidly to ground.

9. The pulse processor of claim 7 wherein said bistable means is a multivibrator whose output represents the output of said pulse processor.

10. The pulse processor of claim 7 wherein said scintillation counter is a camera for use in nuclear medicine.

11. The pulse processor of claim 7 wherein said scintillation counter is a device for use in oil well data logging.

* * * * *